Oct. 12, 1948.                J. F. O'BRIEN ET AL                2,450,908
                                CONDUIT RECEPTACLE
Filed Aug. 2, 1944                                        3 Sheets-Sheet 2
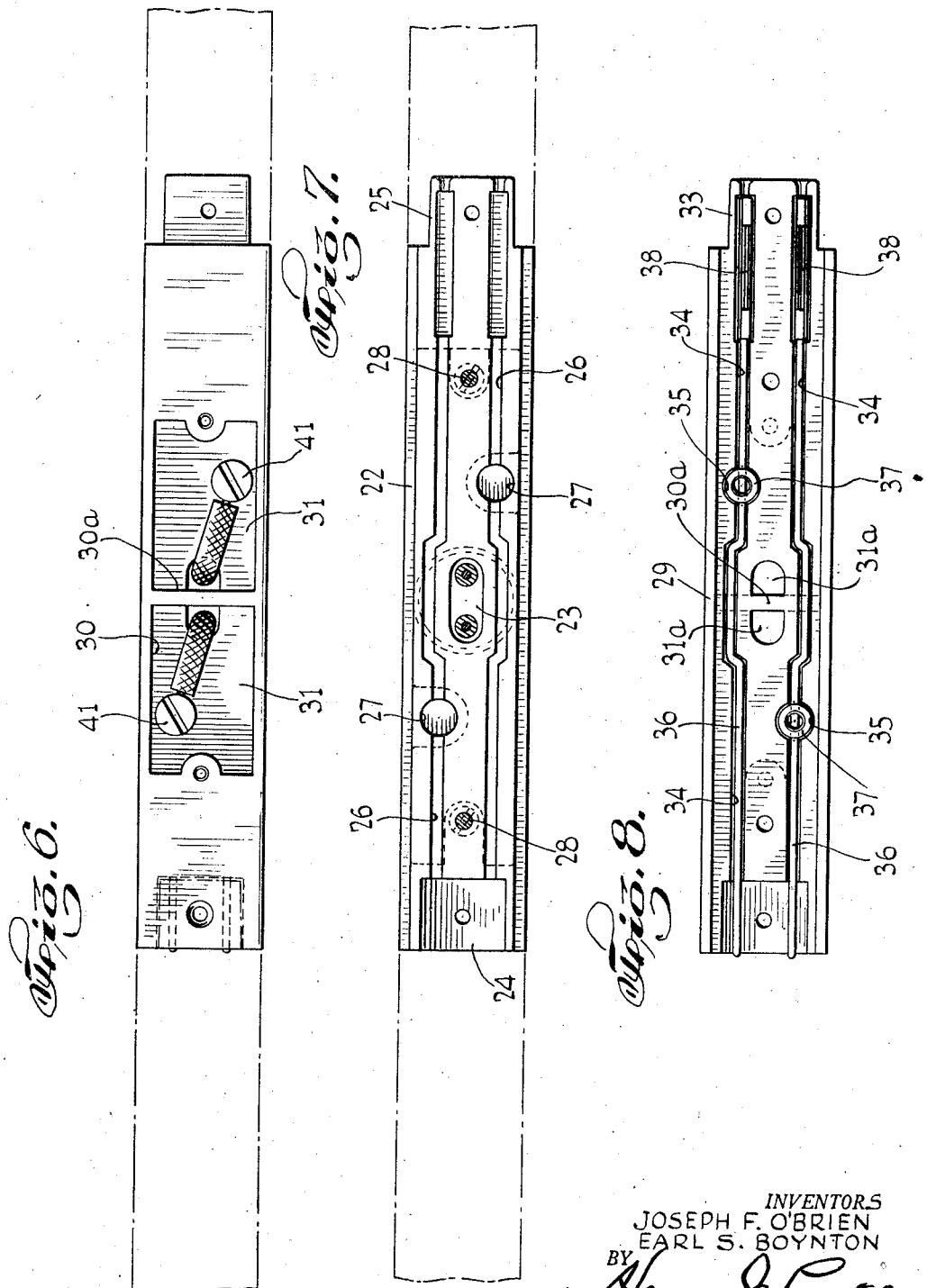
INVENTORS
JOSEPH F. O'BRIEN
EARL S. BOYNTON
BY
Henry J. Lucke
ATTORNEY

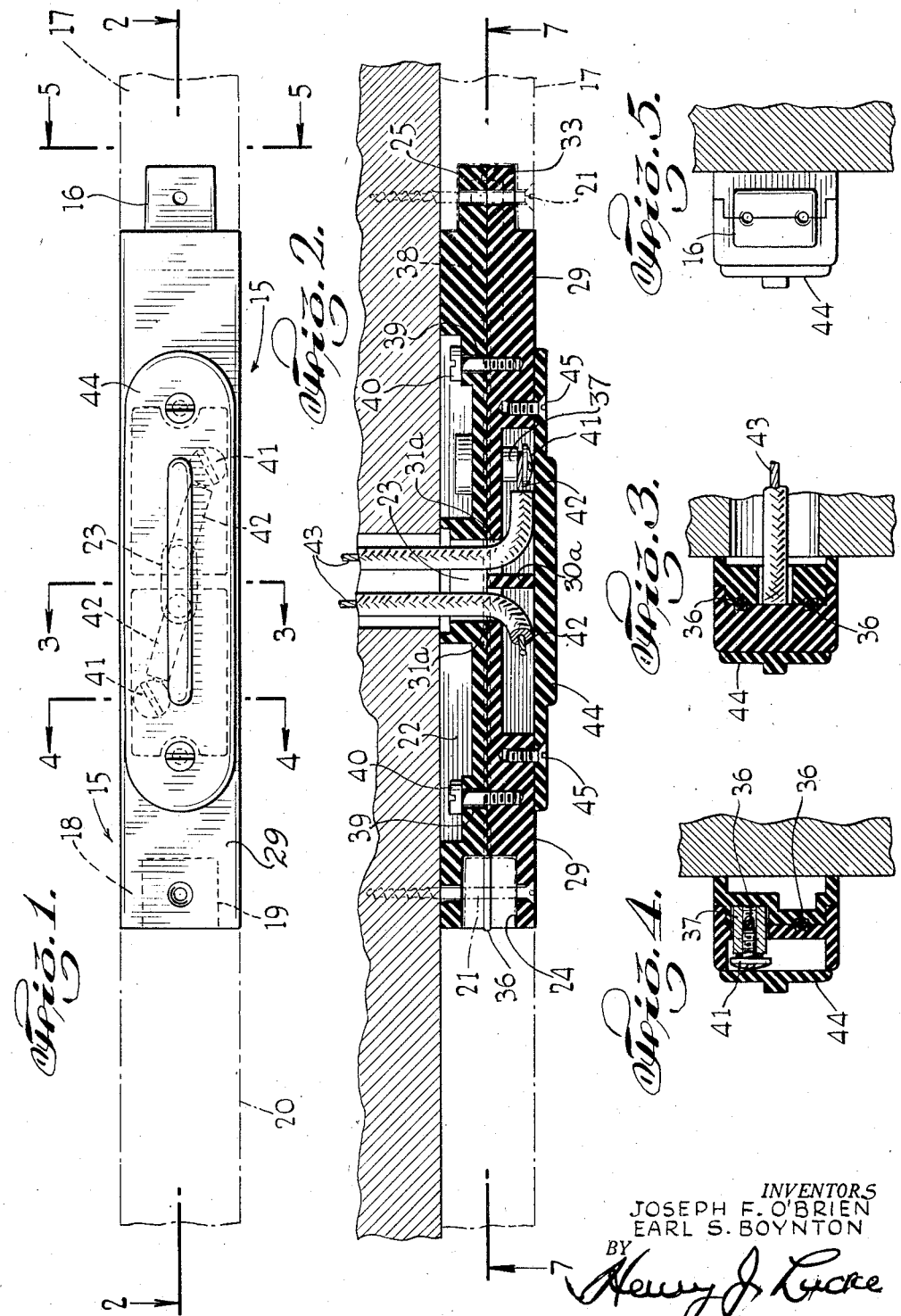

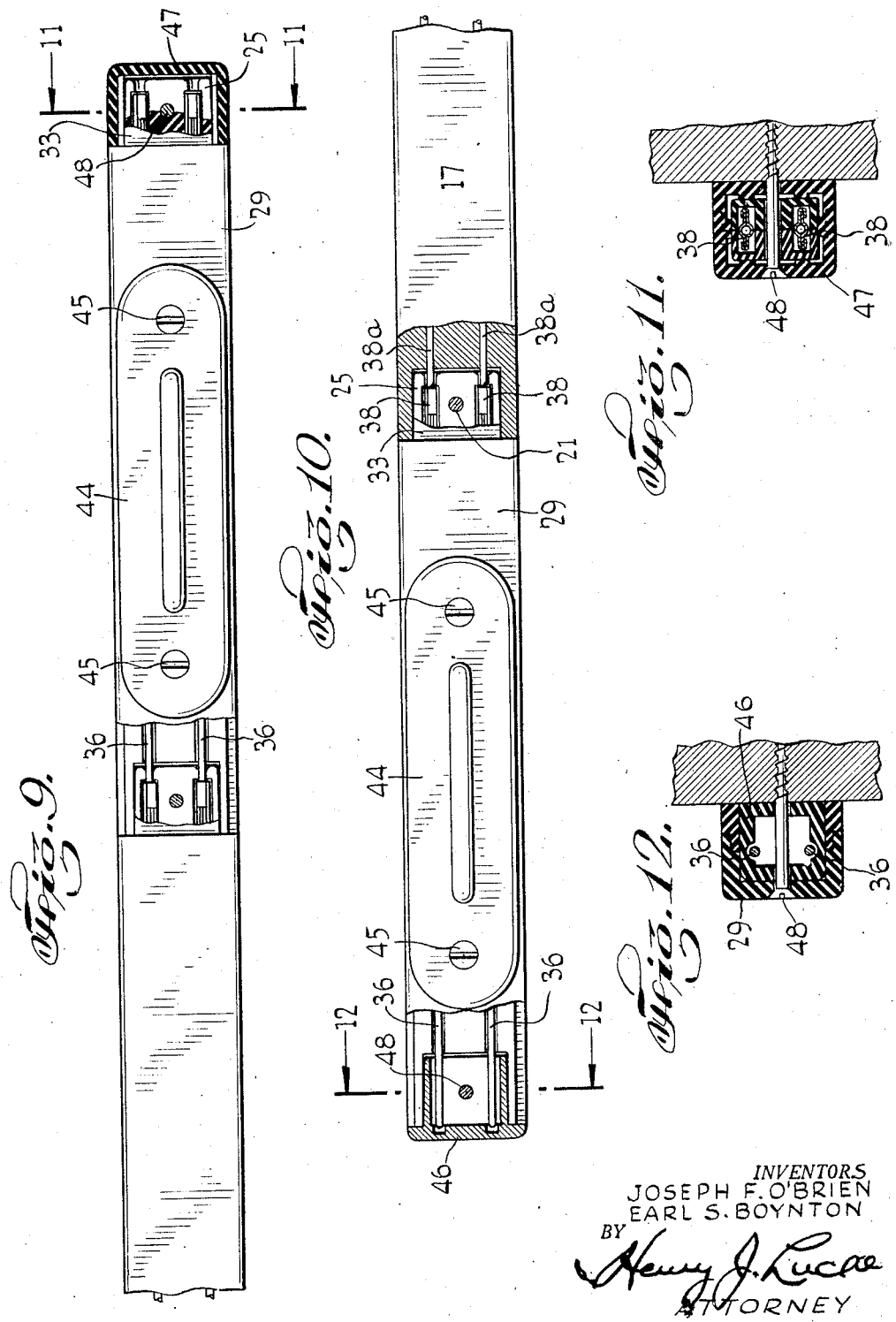

Patented Oct. 12, 1948

2,450,908

UNITED STATES PATENT OFFICE 2,450,908

CONDUIT RECEPTACLE

Joseph F. O'Brien, Lebanon, and Earl S. Boynton, East Orange, N. J., assignors to John B. Pierce Foundation, New York, N. Y., a corporation of New York Application August 2, 1944, Serial No. 547,767

4 Claims. (Cl. 174—59)

The invention has for its object to provide a device of the character specified whereby the ends of conduit sections may be readily connected to form a continuous conduit including a feed receptacle to receive the terminal ends of the mains extending from a source of electric energy or power.

Further, said invention has for its object to provide a construction formed of a plurality of conforming parts which, when duly assembled, will serve to connect the electric conductors, and to unite the opposing ends of two conduit sections to form a continuous conduit of any desired length.

Further, said invention has for its object to provide a feed receptacle which will conform in general state and appearance with the conduit sections which are connected or joined therewith to form a continuous conduit.

Further, said invention has for its object to provide a conduit construction including a feed receptacle in which the feed receptacle corresponds in form and appearance to the conduit sections connected thereby, and in which the opposite ends of said feed receptacle are provided with connecting means adapted to interengage with cooperating means at the adjacent ends of the conduit sections.

Further, said invention has for its object to provide a feed receptacle of the character specified in which the electric conductors enclosed therein are so arranged and disposed that the same are positively insulated and maintained free from the terminals of the mains extending from a source of electric energy.

Further, said invention has for its object to provide a feed receptacle of the character specified in which the terminals of the mains secured in said receptacle are rendered easily accessible for the purposes of inspection, repair or disconnection by the mere removal of an exposed cover plate.

Other objects will, in part, be obvious, and, in part, be hereinafter pointed out.

To the attainment of the aforesaid objects and ends our invention consists in the novel features of construction, and in the combination, connection and arrangement of parts hereinafter more fully described and then pointed out in the claims.

In the accompanying drawings:

Figure 1 is a front or face view showing one form of feed receptacle constructed according to, and embodying our said invention;

Fig. 1 is a longitudinal section on the line 2—2 of Fig. 1;

Fig. 3 is a transverse section on the line 3—3 of Fig. 1;

Fig. 4 is a transverse section on the line 4—4 of Fig. 1;

Fig. 5 is a transverse section on the line 5—5 of Fig. 1;

Fig. 6 is a plan or top view of the top member of the device;

Fig. 7 is a plan view of the base member of the device;

Fig. 8 is an inverted plan view of the top member of the device with the electric conductors secured therein;

Figs. 9 and 10 are front or face views of the device with the end portions thereof partly broken away to show the means for connecting the same with cooperating end portions of conduit sections;

Fig. 11 is a transverse section on the line 11—11 of Fig. 9; and

Fig. 12 is a transverse section taken on the line 12—12 of Fig. 10.

In said drawings 15 designates the feed receptacle which is shown of rectangular outline and relatively long length, and provided at one end with a rectangular projection or male member 16 to be received within the socket or female end of a conduit section 17, and at its other end with a socket or female end 18 to receive the rectangular end portion 19 of a conduit section 20. The said parts are maintained in duly associated relation and secured to a wall or other support by screws 21 passing through said interengaging end parts and into the wall or support.

The receptacle 15 consists of a base member 22 having an elongated aperture 23 about midway between its ends, a socket portion 24 at one end, and a reduced projecting portion 25 at its opposite end. In the upper side of said base member are provided two parallel electric conductor channel portions 26, 26, which extend entirely longitudinally of the base member from end to end of the base member 22, see Fig. 7, and at points adjacent the elongated aperture are sockets 27, 27, and near the opposite ends of said base member 22 are provided small screw-threaded apertures 28, 28.

29 denotes a top member which is conformed to and corresponds in outline to the base member 22 and is provided in its upper side with a longitudinal recess 30, see Fig. 6, having a transverse partition 30ª intermediate the ends thereof which serves to divide said recess into two pockets each having an opening 31ª, see Fig. 2, in its base adjacent the partition 30ª and communicating with the elongated aperture 23 in the base member 22. The top member 29 is provided at its one end with a socket portion 24 registering with the socket portion 24 of the base member 22, and at its other end with a reduced projecting portion 33 registering with the projecting portion 25 of the base member. The underside of the top member is provided with two parallel channel portions 34, 34, see Fig. 8, and circular apertures 35, 35, which conform to and register with the channel portions 26, 26 and sockets 27, 27, see Fig. 7, respectively, in the upper side of the base member 22. The said channel portions 26, 34, when the top member and base member are duly assembled, serve to form continuous channels to enclose the electric conductors 36, 36 which pass transversely through the screw-threaded terminal posts 37, disposed within the socked portions 27, 32, of the base member 22 and top member 29, respectively.

Each conductor 36 is provided at one end with a relatively flat, longitudinal socket portion 38, see Fig. 8, to receive the one end of a conductor 38ª, extending from the conduit section 17, see Fig. 10. The top member 29 is also provided with small apertures 39 which register with the screw-threaded apertures to receive screws 40 which serve to hold said base 22 and top 29 secured together. The upper threaded ends of the terminal posts 37, 37, see Figs. 2 and 4, are provided with screws 41 whereby the ends 42 of the mains 43 introduced through the openings 31ª of the pockets 31, 31 may be connected to said conductors 36, 36.

44 denotes a cover member secured by screws 45 to the top member 29 for closing the recess 30 therein.

When the receptacle 15 constitutes the terminal end of a conduit line, the free end of said receptacle 15 may be closed by a cover or plug 46, or a cap 47 (see Figs. 9 and 10), depending upon whether the male or female end of the receptacle remains exposed. The said parts are provided with registering apertures to receive the attaching screws 48.

The operation of the device will be obvious from the foregoing description.

We claim:

1. A feed conduit of the character described, comprising a base member having an inlet therein for the reception of the terminal ends of the mains extending from a source of electric energy, a top member conformed to said base member having a recess in its upper side, a transverse partition dividing said recess into two pockets severally provided with openings communicating with said inlet, conforming channels in opposing surfaces of said base member and said top member and extending longitudinally of the feed conduit, electric conductors confined in said channels and substantially coextensive therewith, threaded posts disposed partly within said top member and partly within said base member and secured to said electric conductors, said posts extending into pockets in said top member and binding screws engaging said posts for securing the terminal ends of the mains extending into said pockets from said inlet, and a cover member secured to said top member for closing said recess therein.

2. A feed conduit of the character described, comprising a base member and a top member conformed to said base member, connecting means at the opposite registering end portions of said base member and said top member engageable with the conforming ends of adjacent conduit sections, means for securing the same together; said base member having an inlet therein for the reception of the terminal ends of the mains extending from a source of electric energy, and said top member having a recess in its upper side, a transverse partition in said recess dividing the same into two pockets severally provided with openings communicating with said inlet, conforming, registering channels in the opposing surfaces of said base member and said top member and below the recess in said base member, said channels extending longitudinally through the feed conduit, electric conductors substantially coextensive therewith, threaded posts secured at their lower ends in said base member and having their upper ends free and extending into the pockets in said top member and secured intermediate their ends to said electric conductors, binding screws engaging the upper ends of said posts for connecting the terminal ends of the mains to said conductors, and a cover plate secured to said top member for closing the recess therein.

3. An electrical feed receptacle comprising a base member having an inlet for the reception from the rear thereof of supply electrical conductors, said base member being provided at its front face with mutually parallel channels; a top member provided with an opening registering with said inlet and having at its rear face mutually parallel channels and respectively coincident with said mutually parallel channels of said base member whereby to form channels for the reception and retention therein of electrical conductors; means for securing said top member relative to said base member; said top member and said base member being provided with registering apertures; posts disposed in said registering apertures respectively, said posts being provided with terminals accessible through said opening of said top member, said terminals serving for connection with said second named electrical conductors; and cover means for said top member for concealing said posts and said terminals and the therewith connected electrical conductors.

4. An electrical feed receptacle for a seriatim connected conduit system, the units of which are provided each at one end with a male formation and at the opposite end with a female formation, comprising a base member having an inlet for the reception from the rear thereof of supply electrical conductors, the body portion of said base member being provided at its front face with mutually parallel channels; a top member provided with an opening registering with said inlet and having at the rear face of its body portion mutually parallel channels and respectively coincident with said mutually parallel channels of said base member whereby to form channels for the reception and retention therein of electrical conductors; means for securing said top member relative to said base member; devices carried at the front face of said top member for securing the terminals of said supply electrical conductors, said devices extending through said top member to respectively connect with said second named electrical conductors; extensions projecting respectively at the opposite ends of said base member provided at their respective front faces with mutually parallel channels in continuation of said mutually parallel channels of the body portion of said base member for the reception and retention of said second named electrical conductors; extensions projecting respectively at the opposite ends of said top member and provided at their rear faces with mutually parallel channels in continuation of said mutually parallel channels of the body portion of said top member; said extension of said base member at one end forming with said extension of said top member at said end a male formation, said extension of said base member at its other end forming with said extension of said top member at said end a female formation; and cover means for said top member for concealing said devices and the terminal portions of said supply electrical conductors.

JOSEPH F. O'BRIEN.
EARL S. BOYNTON.

REFERENCES CITED

The following references are of record in the file of this patent:

UNITED STATES PATENTS

| Number | Name | Date |
| --- | --- | --- |
| 434,076 | Zopke | Aug. 12, 1890 |
| 2,119,066 | Abbott | May 31, 1938 |
| 2,175,146 | Davison | Oct. 3, 1939 |
| 2,175,148 | Davison | Oct. 3, 1939 |
| 2,197,897 | Peck | Apr. 23, 1940 |
| 2,358,346 | O'Brien | Sept. 19, 1944 |